United States Patent
Choi et al.

(10) Patent No.: US 12,086,212 B2
(45) Date of Patent: Sep. 10, 2024

(54) BURST IMAGE-BASED IMAGE RESTORATION METHOD AND APPARATUS

(71) Applicant: Samsung Electronics Co., Ltd., Suwon-si (KR)

(72) Inventors: Jaeseok Choi, Yongin-si (KR); Nahyup Kang, Seoul (KR); Hyongeuk Lee, Suwon-si (KR); Byungin Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 183 days.

(21) Appl. No.: 17/374,174

(22) Filed: Jul. 13, 2021

(65) Prior Publication Data

US 2022/0253642 A1    Aug. 11, 2022

(30) Foreign Application Priority Data

Feb. 8, 2021    (KR) .......................... 10-2021-0017439

(51) Int. Cl.
*G06F 18/25*    (2023.01)
*G06N 3/08*    (2023.01)
*G06T 5/70*    (2024.01)
*G06T 5/73*    (2024.01)
*G06V 10/46*    (2022.01)

(52) U.S. Cl.
CPC .............. *G06F 18/253* (2023.01); *G06N 3/08* (2013.01); *G06T 5/70* (2024.01); *G06T 5/73* (2024.01); *G06V 10/462* (2022.01)

(58) Field of Classification Search
CPC ........ G06F 18/253; G06N 3/08; G06N 3/045; G06N 3/02; G06T 5/002; G06T 5/003; G06T 2207/10016; G06T 2207/10141; G06T 2207/20081; G06T 2207/20084; G06T 2207/20221; G06T 5/001;
(Continued)

(56) References Cited

U.S. PATENT DOCUMENTS 9,762,893 B2    9/2017    Barron et al.
10,477,185 B2    11/2019    Barron et al.
(Continued)

FOREIGN PATENT DOCUMENTS

JP    2010-239440 A    10/2010
JP    2015-158796 A    9/2015
(Continued)

OTHER PUBLICATIONS

A. G. Vien, H. Park and C. Lee, "Moire Artifacts Removal in Screen-shot Images via Multiple Domain Learning," 2020 Asia-Pacific Signal and Information Processing Association Annual Summit and Conference (APSIPA ASC), Auckland, New Zealand, 2020, pp. 1268-1273. (Year: 2020).*
(Continued)

*Primary Examiner* — Andrae S Allison
(74) *Attorney, Agent, or Firm* — NSIP Law

(57) ABSTRACT

An image restoration method includes determining an anchor image based on individual images of a burst image set, executing a feature extraction network based on the burst image set while using anchor information of the anchor image, and generating a restored image based on a feature map corresponding to an output of the feature extraction network.

19 Claims, 14 Drawing Sheets

(58) Field of Classification Search
CPC ......... G06T 5/005; G06T 3/4046; G06T 7/11;
G06T 2207/20016; G06V 10/462; G06V 10/40
See application file for complete search history.

(56) References Cited

U.S. PATENT DOCUMENTS

| | | | |
|---|---|---|---|
| 10,535,156 B2 | 1/2020 | Joshi et al. | |
| 11,443,423 B2* | 9/2022 | Ezhov | .................. G06T 3/0018 |
| 2015/0002704 A1* | 1/2015 | Vidal-Naquet | ......... G06T 7/337 348/241 |
| 2015/0043811 A1* | 2/2015 | Prabhudesai | ............. G06T 5/50 382/164 |
| 2018/0189937 A1* | 7/2018 | Bala | ........................ G06T 7/337 |
| 2021/0049474 A1* | 2/2021 | Son | ........................ G06N 3/044 |
| 2021/0272236 A1* | 9/2021 | Wang | ....................... G06T 5/008 |
| 2021/0303911 A1* | 9/2021 | Li | ........................... G06V 10/82 |
| 2022/0020126 A1* | 1/2022 | Zhen | ........................ G06T 5/20 |
| 2022/0101503 A1* | 3/2022 | Ivanov | ................. H04N 23/741 |
| 2022/0156888 A1* | 5/2022 | Kim | ........................ G06N 3/08 |
| 2022/0253642 A1* | 8/2022 | Choi | ...................... G06T 5/002 |

FOREIGN PATENT DOCUMENTS

| | | | |
|---|---|---|---|
| KR | 10-2013-0094632 A | 8/2013 |
| KR | 10-2014-0045804 A | 4/2014 |
| KR | 10-2014-0134549 A | 11/2014 |
| KR | 10-1437920 B1 | 11/2014 |
| KR | 10-1590467 B1 | 2/2016 |
| KR | 10-2016-0142760 A | 12/2016 |
| KR | 2018-0102964 A | 9/2018 |
| KR | 10-2061867 B1 | 1/2020 |
| KR | 10-2089500 B1 | 5/2020 |

OTHER PUBLICATIONS

Anonymous authors, Burst Image Restoration and Enhancement, Under review as a conference paper at ICLR 2022 (Year: 2022).*
Wieslander, Hakan, Carolina Wahlby, and Ida-Maria Sintorn. "TEM image restoration from fast image streams." Plos one 16.2 (Feb. 1, 2021): e0246336. (Year: 2021).*
Wronski, Bartlomiej, et al. "Handheld multi-frame super-resolution." ACM Transactions on Graphics (ToG) 38.4 (2019): 1-18. (Year: 2019).*
Extended European Search Report issued on May 11, 2022 in counterpart European Patent Application No. 21207598.0 (9 pages in English).
Vien, An Gia, et al. "Dual-domain deep convolutional neural networks for image demoireing." *Proceedings of the IEEE/CVF Conference on Computer Vision and Pattern Recognition Workshops.* (2020). pp 1934-1942.
Yuan, Shanxin, et al. "Ntire 2020 challenge on image demoireing: Methods and results." *Proceedings of the IEEE/CVF Conference on Computer Vision and Pattern Recognition Workshops.* (2020). pp 1882-1893.
Wang, Zhouxia, et al. "Learning a reinforced agent for flexible exposure bracketing selection." *Proceedings of the IEEE/CVF conference on computer vision and pattern recognition.* (2020). pp 1817-1825.
Pan, Zhiyong, et al. "Multi-exposure high dynamic range imaging with informative content enhanced network." *Neurocomputing* 386 (2020). pp 147-164.
Liang, Zhetong, et al. "A decoupled learning scheme for real-world burst denoising from raw images." *European Conference on Computer Vision.* Springer, Cham, (2020). pp 150-166.

* cited by examiner

BURST IMAGE-BASED IMAGE RESTORATION METHOD AND APPARATUS

CROSS-REFERENCE TO RELATED APPLICATIONS

This application claims the benefit under 35 USC § 119(a) of Korean Patent Application No. 10-2021-0017439, filed on Feb. 8, 2021, in the Korean Intellectual Property Office, the entire disclosure of which is incorporated herein by reference for all purposes.

BACKGROUND

1. Field

The following description relates to a method and apparatus for restoring an image based on burst images.

2. Description of Related Art

Image restoration is a technique for restoring an image with a deteriorated quality into an image with an enhanced quality. For image restoration, a deep learning-based neural network may be used. A neural network may be trained based on deep learning and then perform inference for its purpose by mapping input data and output data in a nonlinear relationship. The ability to generate the above mapping may be expressed as a learning ability of the neural network. Also, the neural network trained for a specialized purpose, for example, image restoration, may have a generalization ability to generate a relatively accurate output for an input pattern that is not learned.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image restoration method includes determining an anchor image based on individual images of a burst image set, executing a feature extraction network based on the burst image set while using anchor information of the anchor image, and generating a restored image based on a feature map corresponding to an output of the feature extraction network.

The determining of the anchor image may include selecting the anchor image among the individual images based on any one or any combination of any two or more of a quality-based selection, a time interval-based selection, and a random selection.

The determining of the anchor image may include generating the anchor image by applying weights to the individual images.

The anchor information may include either one or both of image information of the anchor image and feature information of the anchor image.

The method may further include generating input images for the feature extraction network by fusing the anchor information with each of the individual images.

The executing of the feature extraction network may include extracting an anchor local feature from the anchor image, extracting a local feature from another image among the individual images, extracting a global feature from the anchor local feature and the local feature, and fusing the anchor local feature with the global feature.

The executing of the feature extraction network may include extracting an anchor local feature from the anchor image, extracting a local feature from another image among the individual images, and extracting a global feature from the anchor local feature and the local feature while using the anchor local feature.

The executing of the global features may include extracting the global feature from the anchor local feature and the local feature of the other image by assigning a higher weight to the anchor local feature than the local feature of the other image.

The executing of the feature extraction network may include extracting a local feature while using the anchor information for each of a plurality of layer groups of the feature extraction network.

The executing of the local feature may include extracting a primary local feature from a first individual image of the individual images using a first layer group of the plurality of layer groups, transforming the primary local feature by fusing the anchor information with the primary local feature, extracting a secondary local feature from the transformed primary local feature using a second layer group of the plurality of layer groups, and determining a global feature based on the secondary local feature.

The generating of the restored image may include executing an image restoration network based on the feature map.

A non-transitory computer-readable storage medium may store instructions that, when executed by one or more processors, cause the one or more processors to perform the method above.

In another general aspect, an image restoration apparatus includes one or more processors, and a memory comprising instructions executable by the one or more processors. In response to the instructions being executed by the one or more processors, the one or more processors are configured to determine an anchor image based on individual images of a burst image set, execute a feature extraction network based on the burst image set while using anchor information of the anchor image, and generate a restored image based on a feature map corresponding to an output of the feature extraction network.

The one or more processors may be further configured to select the anchor image among the individual images based on any one or any combination of any two or more of a quality-based selection, a time interval-based selection, and a random selection, or generate the anchor image by applying weights to the individual images.

The one or more processors may be further configured to extract an anchor local feature from the anchor image, extract a local feature from another image among the individual images, and extract a global feature from the anchor local feature and the local feature of the other image while using the anchor local feature.

The one or more processors may be further configured to extract a local feature while using the anchor information for each of a plurality of layer groups of the feature extraction network.

In another general aspect, an electronic apparatus includes a camera configured to generate a burst image set, and one or more processors. The one or more processors are configured to determine an anchor image based on individual images of the burst image set, execute a feature extraction network based on the burst image set while using anchor information of the anchor image, and generate a restored image based on a feature map corresponding to an output of the feature extraction network.

The one or more processors may be further configured to select the anchor image among the individual images based on any one or any combination of any two or more of a quality-based selection, a time interval-based selection, and a random selection, or generate the anchor image by applying weights to the individual images.

The one or more processors may be further configured to extract an anchor local feature from the anchor image, extract a local feature from another image among the individual images, and extract a global feature from the anchor local feature and the local feature of the other image while using the anchor local feature.

The one or more processors may be further configured to extract a local feature while using the anchor information for each of a plurality of layer groups of the feature extraction network.

In another general aspect, an electronic apparatus includes an image sensor configured to capture a plurality of images, and one or more processors. The one or more processors are configured to determine an anchor image from the plurality of images, execute a feature extraction network based on the plurality of images while using anchor information of the anchor image, and generate a restored image based on a feature map corresponding to an output of the feature extraction network.

The one or more processors may be further configured to extract an anchor local feature from the anchor image, extract a local feature from another image among the individual images, and extract a global feature from the anchor local feature and the local feature by assigning a higher weight to the anchor local feature than the local feature.

The electronic apparatus may be a camera or a smartphone.

The plurality of images may be captured sequentially.

The electronic apparatus may further include a memory configured to store instructions. The one or more processors may be further configured to execute the instructions to configure the one or more processors to determine the anchor image from the plurality of images, execute the feature extraction network based on the plurality of images while using the anchor information of the anchor image, and generate the restored image based on the feature map corresponding to the output of the feature extraction network.

Other features and aspects will be apparent from the following detailed description, the drawings, and the claims.

Figure 1:
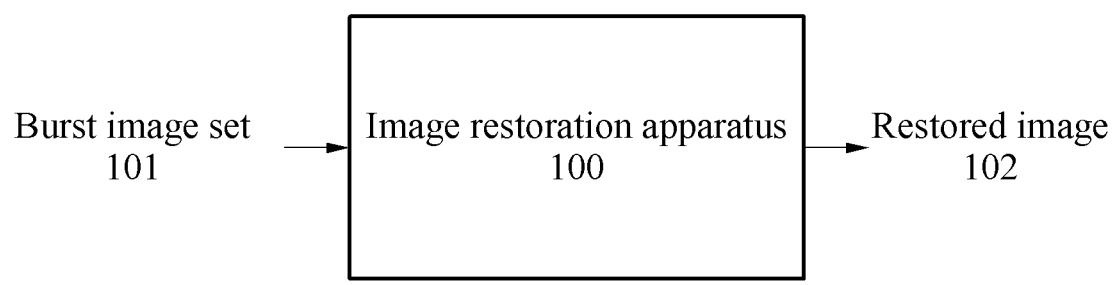
FIG. 1 schematically illustrates an example of an operation of an image restoration apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. As used herein, the term "and/or" includes any one and any combination of any two or more of the associated listed items. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, and like reference numerals in the drawings refer to like elements throughout.

FIG. 1 schematically illustrates an example of an operation of an image restoration apparatus. Referring to FIG. 1, an image restoration apparatus 100 may receive a burst image set 101, generate a restored image 102 based on the burst image set 101, and output the restored image 102. The burst image set 101 may be generated by a camera. The burst image set 101 may include a plurality of images that are consecutively captured. The burst image set 101 may be, for example, a video generated through a video shooting function or consecutive still images generated through a continuous shooting function. Each of the plurality of images in the burst image set 101 may refer to an "individual image." In an example of a video, each image frame may correspond to an individual image. In an example of a burst image, each still image may correspond to an individual image. The camera may be an image sensor.

For example, when it is assumed that the burst image set 101 is generated by capturing a target object using a camera, individual images of the burst image set 101 may have different characteristics due to the movement of the camera and/or the target object, and/or a change in ambient light (for example, an illuminance or color). In an example, when the burst image set 101 is obtained in a poor environment, such as a low illuminance environment, and/or when each individual image has a deteriorated quality, the restored image 102 with an enhanced quality may be derived by properly combining various characteristics of individual images. Thus, the restored image 102 with high quality may be derived through a process of restoring individual images with low qualities.

Since objects in each individual image are changed in position due to the movement of a camera and/or a target object, a pre-task of matching objects of each individual image by aligning center lines of each individual image may be required. The center line may not be an actual line represented in each individual image, and a virtual line may be used as a criterion to align individual images. If there is no such pre-task, a severe blur phenomenon may occur. However, to perform the pre-task, the calculation amount and calculation time may significantly increase. In addition, since the task of aligning center lines requires iterative processing, the calculation amount and calculation time may significantly increase as the number of individual images increases.

The image restoration apparatus 100 may determine an anchor image based on the individual images of the burst image set 101, execute a neural network model while using anchor information of the anchor image, and generate the restored image 102. For example, an operation of generating the restored image 102, using the anchor information, may include an operation of generating the restored image 102 based on the anchor information by iteratively using (for example, emphasizing) the anchor information in an image restoration process. Such an image restoration operation of the image restoration apparatus 100 may be provided based on the anchor information of the anchor image instead of a center line. Accordingly, the restored image 102 with the enhanced quality may be derived without the task of aligning center lines. Since the task of aligning center lines is not necessary, the calculation amount and calculation time for image restoration may be reduced, and the tendency of the calculation amount and calculation time to significantly increase based on the number of individual images may be resolved.

The image restoration apparatus 100 may select an anchor image among the individual images of the burst image set 101 or generate an anchor image based on the image information of the individual images. In an example, the image restoration apparatus 100 may select an anchor image, among the individual images, based on any one or any combination of any two or more of a quality-based selection, a time interval-based selection, and a random selection. In another example, the image restoration apparatus 100 may assign a weight to each of the individual images based on a criterion, such as image quality, and may generate an anchor image by applying the weight to each of the individual images.

The image restoration apparatus 100 may execute the neural network model based on the burst image set 101, and generate the restored image 102. For example, the neural network model may include a feature extraction network configured to extract a feature from an individual image of the burst image set 101, and an image restoration network configured to convert the extracted feature to the restored image 102. At least a portion of each of the feature extraction network and the image restoration network may correspond to a deep neural network (DNN), including a plurality of layers. The plurality of layers may include an input layer, at least one hidden layer, and an output layer.

The DNN may include any one or any combination of a fully connected network (FCN), a convolutional neural network (CNN), and a recurrent neural network (RNN). For example, at least a portion of a plurality of layers in a neural network may correspond to a CNN, and another portion may correspond to an FCN. In this example, the CNN may be referred to as a convolution layer, and the FCN may be referred to as a fully connected layer.

In the CNN, data input to each layer may be referred to as an "input feature map," and data output from each layer may be referred to as an "output feature map." The input feature map and the output feature map may also be referred to as activation data. When a convolutional layer corresponds to an input layer, an input feature map of the input layer may correspond to an input image.

The neural network may be trained based on deep learning, and may perform inference suitable for training, by mapping input data and output data in a nonlinear relationship. Deep learning may be a machine learning scheme for solving an issue such as image or voice recognition from a big data set. Deep learning may be understood as a process of solving an optimization issue to find a point at which energy is minimized while training the neural network based on prepared training data.

Through supervised or unsupervised learning of deep learning, a structure of the neural network or a weight corresponding to a model may be obtained, and input data and output data may be mapped to each other through the weight. For example, when a width and a depth of the neural network are sufficiently large, the neural network may have a capacity large enough to implement an arbitrary function.

When the neural network is trained on a sufficiently large quantity of training data through an appropriate training process, optimal performance may be achieved.

In the following description, the neural network may be expressed as being "pre-trained," where "pre-" may indicate a state before the neural network is "started." The "started" neural network may indicate that the neural network may be ready for inference. For example, the "start" of the neural network may include a loading of the neural network in a memory, or input of input data for inference to the neural network after the neural network is loaded in the memory.

The image restoration apparatus 100 may execute a neural network model while using anchor information of an anchor image. For example, the image restoration apparatus 100 may emphasize the anchor information when performing any one or any combination of an operation of inputting an input image to the neural network model, an operation of extracting a feature from the input image using the neural network model, and an operation of outputting the extracted feature. The anchor information may include, for example, image information of the anchor image and/or feature information extracted from the anchor image. The anchor information may provide a geometric criterion for image restoration. Thus, image information of corresponding positions may be combined without a need to align center lines. Accordingly, it is possible to enhance image quality while preventing an occurrence of a blur.

Figure 2:
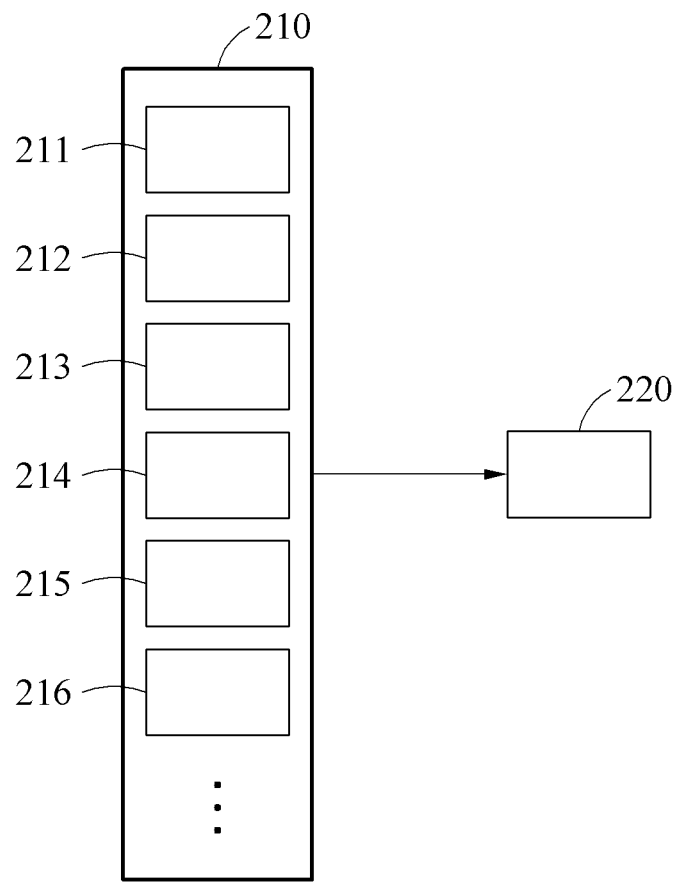
FIGS. 2 to 4 illustrate examples of operations of selecting an anchor image.
Figure 3:
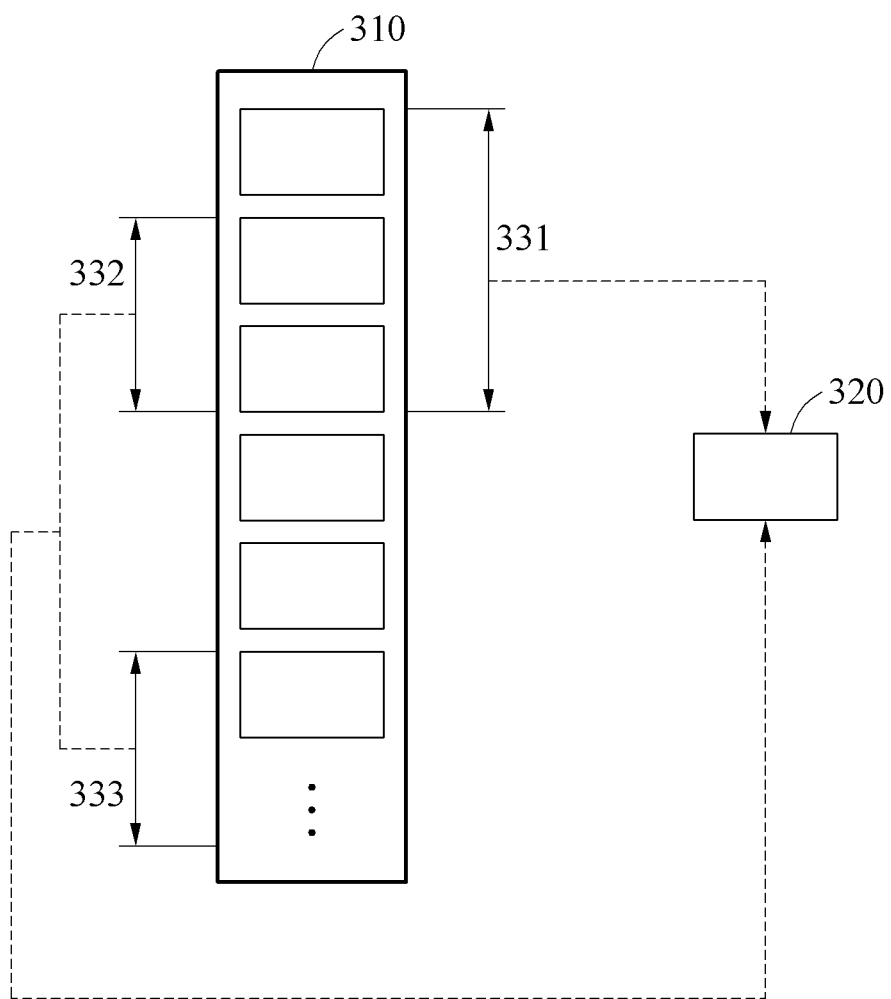
Figure 4:
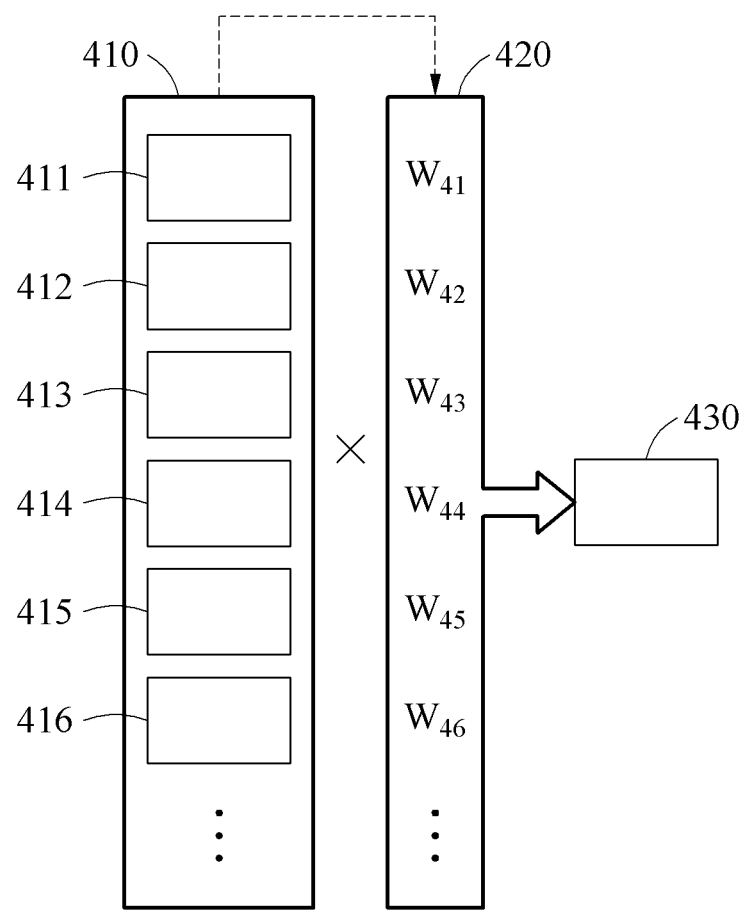

FIGS. 2 to 4 illustrate examples of operations of selecting an anchor image. Referring to FIG. 2, an image restoration apparatus may select an anchor image 220, among a plurality of individual images 211 to 216, of a burst image set 210. In an example, the image restoration apparatus may select the anchor image 220 based on image quality. In this example, the image restoration apparatus may determine the quality of each of the individual images 211 to 216 based on any one or any combination of noise, a blur, a signal-to-noise ratio (SNR), and sharpness, and may select an image with the highest quality as the anchor image 220. The image restoration apparatus may use a deep learning network and/or a calculation module to calculate the above quality.

In another example, the image restoration apparatus may select the anchor image 220 based on an image order. In this example, the individual images 211 to 216 may be captured in order. The image restoration apparatus may select the first individual image, the individual image 211, as the anchor image 220. In another example, the image restoration apparatus may select an arbitrary image among the individual images 211 to 216 as the anchor image 220. This is because an image quality may be enhanced based on image information of the individual images 211 to 216 even though the anchor image 220 for providing a criterion for image restoration has relatively low quality.

Referring to FIG. 3, the image restoration apparatus may select an anchor image 320 among individual images corresponding to a predetermined time interval. For example, a first time interval 331 may cover a period of time from the start of capturing, and the image restoration apparatus may select the anchor image 320 in the first time interval 331. In another example, a plurality of time intervals may be used. For example, a second time interval 332 and a third time interval 333 may cover different capturing times, and the image restoration apparatus may select the anchor image 320 in the second time interval 332 and the third time interval 333.

Referring to FIG. 4, the image restoration apparatus may determine a weight set 420 for a burst image set 410, and may generate an anchor image 430 by applying weights $W_{41}$ to $W_{46}$ to individual images 411 to 416 of the burst image set 410. For example, the image restoration apparatus may determine the weights $W_{41}$ to $W_{46}$ based on image qualities of the individual images 411 to 416, and may generate the anchor image 430 by reflecting image information of the individual images 411 to 416 based on the weights $W_{41}$ to $W_{46}$. In this example, when a weight applied to an image increases, the amount of image information of the image to be provided to the anchor image 430 may increase.

Figure 5:
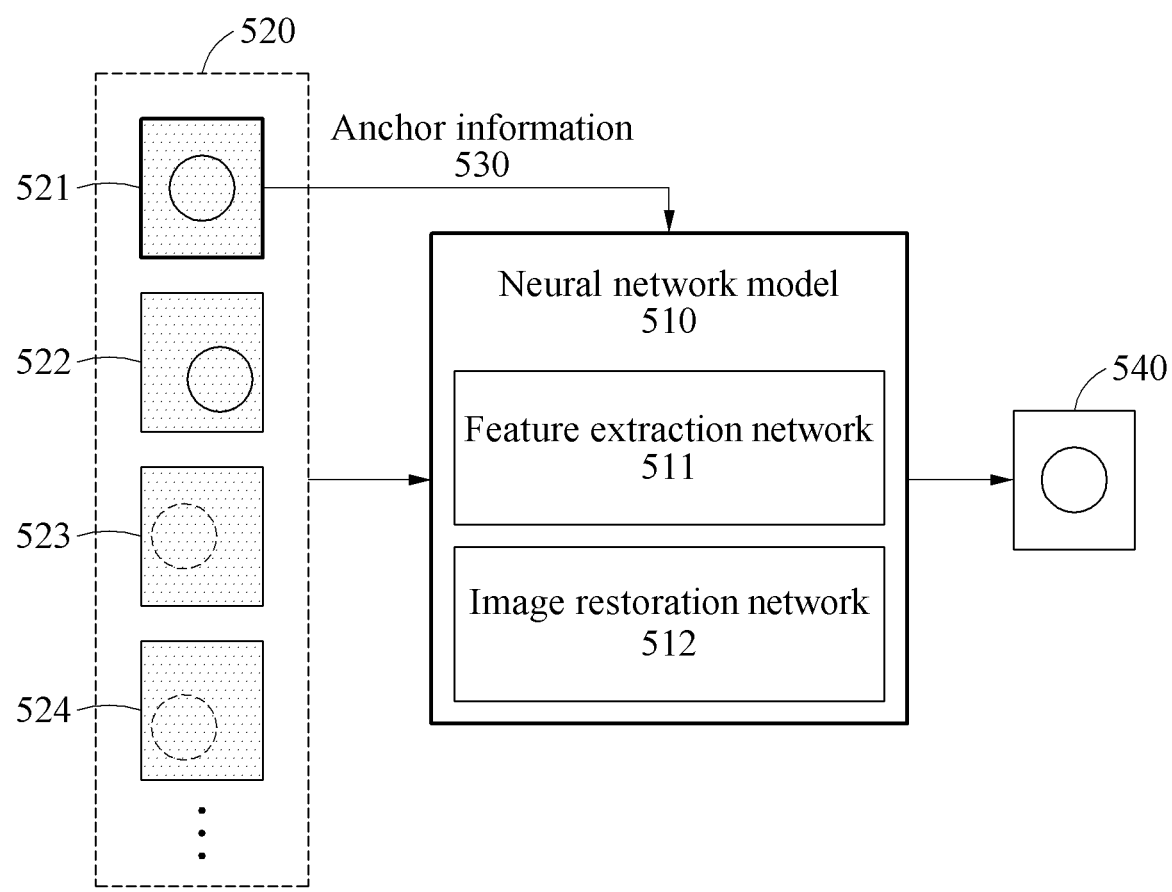
FIG. 5 illustrates an example of generating a restored image based on anchor information.

FIG. 5 illustrates an example of generating a restored image based on anchor information. Referring to FIG. 5, an image restoration apparatus may determine an anchor image based on individual images 521 to 524 of a burst image set 520, may execute a neural network model 510 while emphasizing anchor information 530, and may generate a restored image 540. The burst image set 520 may include the individual images 521 to 524, and the image restoration apparatus may determine an anchor image based on the individual images 521 to 524 according to various criteria. In the example of FIG. 5, the individual image 521 is selected as an anchor image. Although an example of four individual images, for example, the individual images 521 to 524, is described below, the number of individual images may be greater than or less than "4."

The image restoration apparatus may sequentially input the individual images 521 to 524 to the neural network model 510, and execute the neural network model 510 while emphasizing the anchor information 530. For example, the image restoration apparatus may emphasize the anchor information 530 when performing any one or any combination of an operation of inputting the individual images 521 to 524 to the neural network model 510, an operation of extracting features from the individual images 521 to 524 using the neural network model 510, and an operation of outputting the extracted features. The anchor information 530 may include, for example, image information of an anchor image and/or feature information extracted from the anchor image.

The neural network model 510 may include a feature extraction network 511 and an image restoration network 512. The feature extraction network 511 may extract features from the individual images 521 to 524 in response to inputs of the individual images 521 to 524. For example, the feature extraction network 511 may extract local features from the individual images 521 to 524 and may extract global features from the local features. The image restoration network 512 may convert the features to the restored image 540. The feature extraction network 511 may correspond to, for example, an encoder configured to convert image information into feature information, and the image restoration network 512 may correspond to, for example, a decoder configured to convert feature information into image information.

Figure 6:
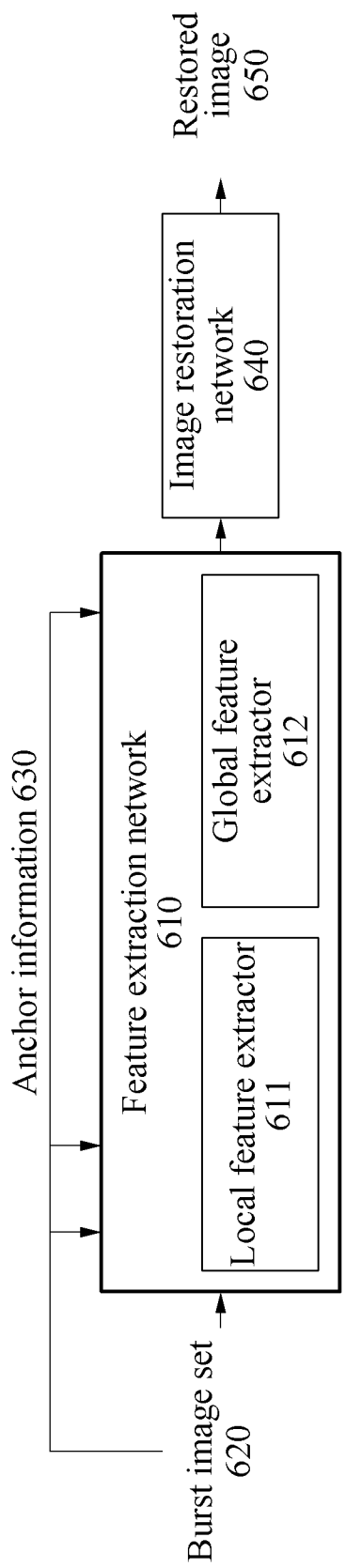
FIG. 6 illustrates an example of a configuration and an operation related to a neural network model.

FIG. 6 illustrates an example of a configuration and an operation related to a neural network model. Referring to FIG. 6, a feature extraction network 610 may include a local feature extractor 611 and a global feature extractor 612. The local feature extractor 611 may extract a local feature from each individual image of a burst image set 620, and the global feature extractor 612 may extract a global feature from the local features. An image restoration network 640 may convert the global feature to a restored image 650. The feature extraction network 610 and the image restoration network 640 may each include a neural network, and may be pre-trained to perform an extraction operation and a conversion operation.

An image restoration apparatus may execute the feature extraction network 610 while iteratively using and/or emphasizing anchor information 630. For example, the image restoration apparatus may emphasize the anchor information 630 when performing any one or any combination of an operation of inputting the individual images to the feature extraction network 610, an operation of extracting features from the individual images using the feature extraction network 610, and an operation of outputting the extracted features. An example of an operation related to the use of the anchor information 630 will be further described below.

Figure 7:
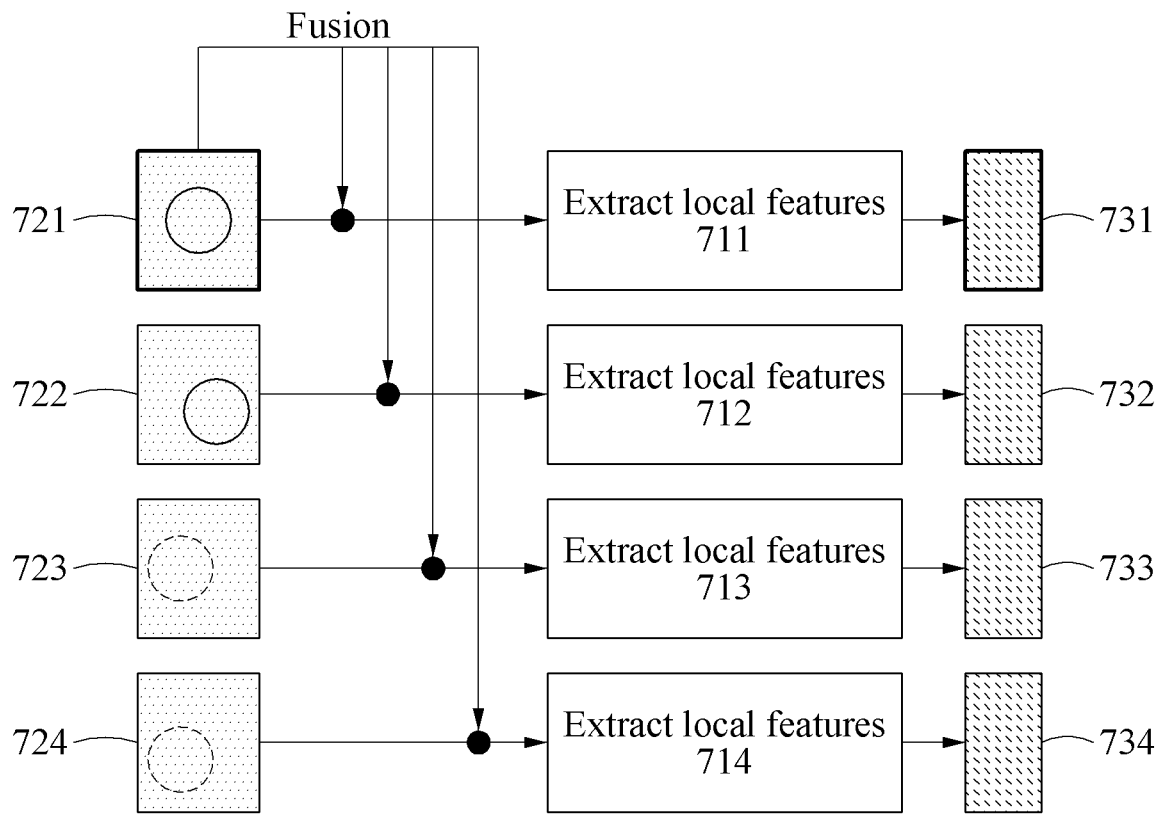
FIG. 7 illustrates an example of an operation of using anchor information in a process of inputting an input image.

FIG. 7 illustrates an example of an operation of using anchor information in the process of inputting an input image. Referring to FIG. 7, an image restoration apparatus may use anchor information of an anchor image in the process of inputting individual images 721 to 724 to a feature extraction network. The feature extraction network may correspond to, for example, a local feature extractor. In the example of FIG. 7, the individual image 721 may be assumed as an anchor image, and the image restoration apparatus may fuse image information of the individual image 721 as anchor information with the individual images 721 to 724.

For example, fusion may include concatenation and/or addition. The concatenation may be linking elements together, and the addition may be the summing of elements. Thus, the concatenation may influence a dimension, whereas the addition may not influence the dimension. The concatenation may be performed in a channel direction. For example, when each of the individual images 721 to 724 has a dimension "W×H×C," a concatenation result may have a dimension "W×H×2C", and an addition result may have a dimension "W×H×C."

The image restoration apparatus may input a fusion result as an input image to the feature extraction network, and may extract local features in operations 711 to 714. For example, the image restoration apparatus may extract a local feature in operation 711 by inputting a result of the fusion of the individual image 721 and anchor image information to the feature extraction network, and as a result, a local feature map 731 may be obtained. Similarly, the image restoration apparatus may extract local features in operations 712 to 714 by sequentially inputting results of the fusion of the other individual images 722 to 724 and the anchor image information to the feature extraction network, and as a result, local feature maps 732 to 734 may be obtained.

Figure 8:
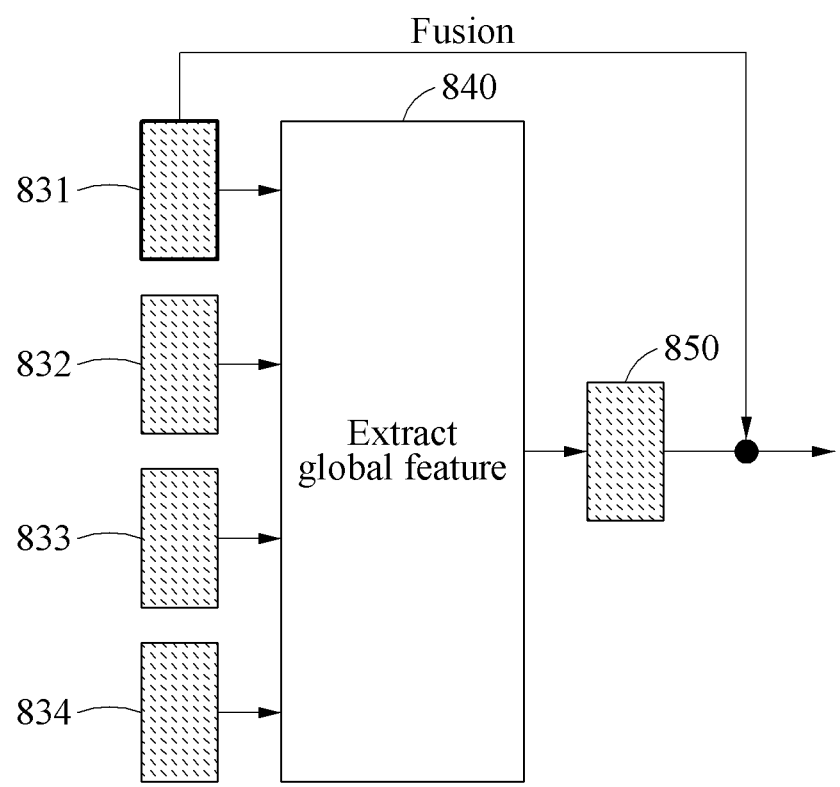
FIG. 8 illustrates an example of an operation of using anchor information in a process of outputting an output feature map.

FIG. 8 illustrates an example of an operation of using anchor information in a process of outputting an output feature map. Referring to FIG. 8, an image restoration apparatus may extract a global feature map 850 from local feature maps 831 to 834 in operation 840 of extracting a global feature, and may use anchor information of an anchor image in a process of outputting the global feature map 850. The image restoration apparatus may perform operation 840 using a feature extraction network. The feature extraction network may correspond to, for example, a global feature extractor. In the example of FIG. 8, the local feature map 831 may be assumed to be extracted from the anchor image, and the image restoration apparatus may fuse feature information of the local feature map 831 as anchor information with the global feature map 850. In this example, the fusing may include concatenation and/or addition. A result of the fusing may correspond to an output feature map of the feature extraction network, and the image restoration apparatus may convert the output feature map to a restored image using an image restoration network.

Figure 9:
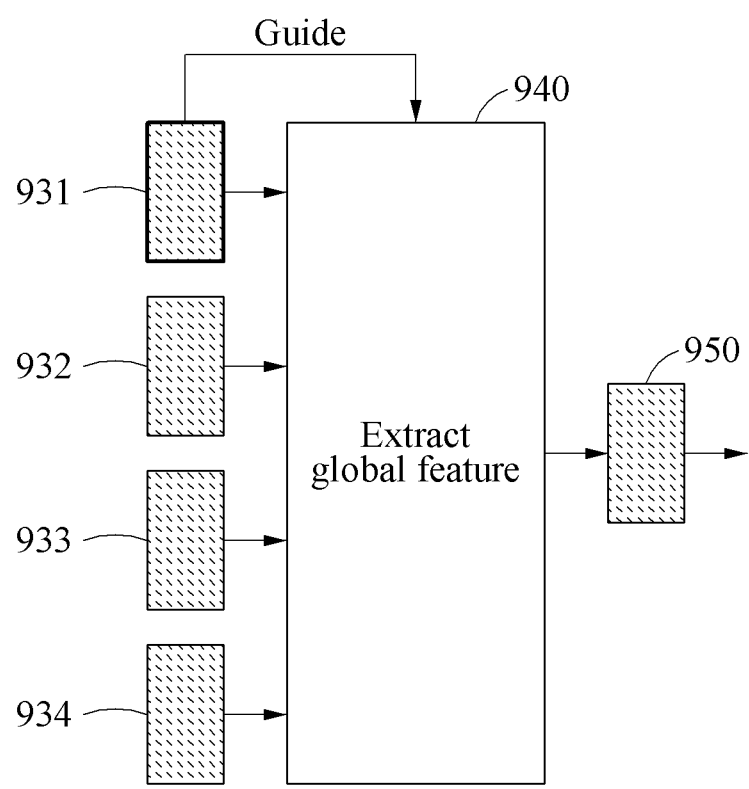
FIG. 9 illustrates an example of an operation of using anchor information in a process of extracting a global feature.

FIG. 9 illustrates an example of an operation of using anchor information in a process of extracting a global feature. Referring to FIG. 9, an image restoration apparatus may extract a global feature map 950 from local feature maps 931 to 934 in operation 940 of extracting a global feature, and anchor information of an anchor image may be used as guide information. In the example of FIG. 9, the local feature map 931 may be assumed to be extracted from the anchor image, and the image restoration apparatus may use feature information of the local feature map 931 as anchor information, that is, guide information. For example, when the local feature map 931 is assumed as an anchor local feature, and when the local feature maps 932 to 934 are assumed as neighboring local features, the image restoration apparatus may assign a higher weight to the anchor local feature than the neighboring local features and may perform operation 940. Thus, information of the anchor local feature may have a great influence on the global feature map 950 in comparison to the neighboring local features.

Figure 10:
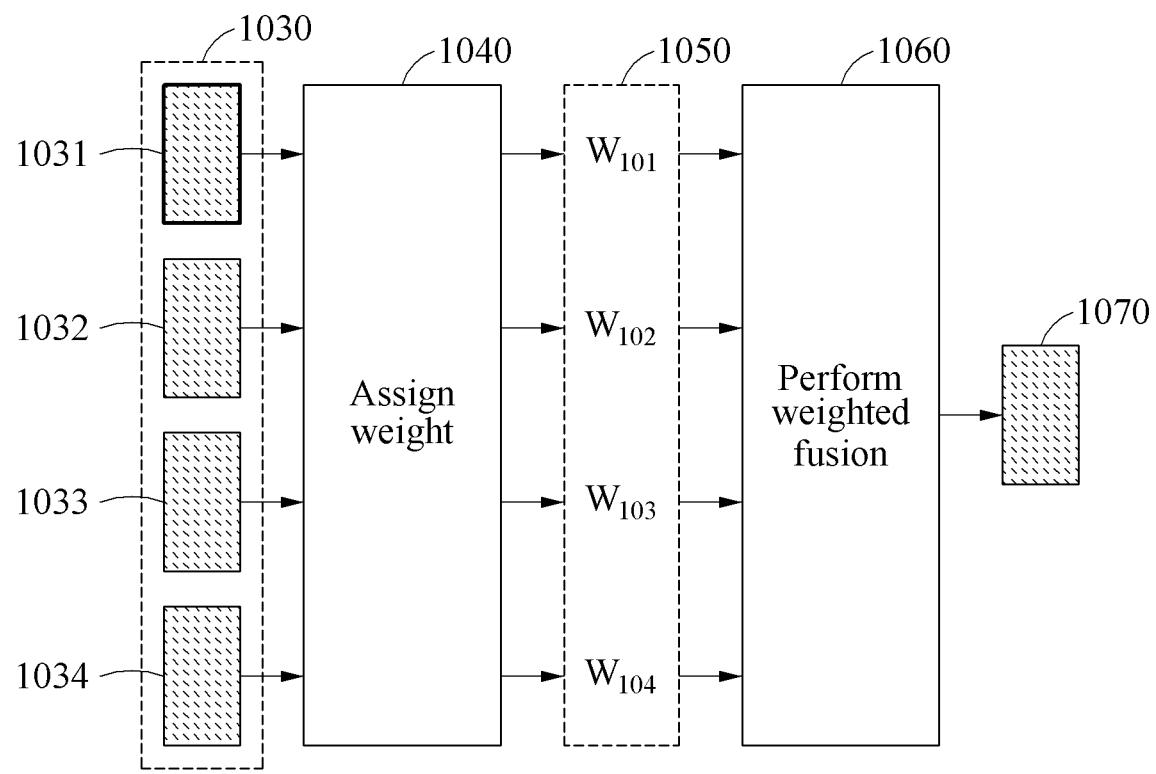
FIG. 10 illustrates an example of the operation of FIG. 9.

FIG. 10 illustrates an example of the operation of FIG. 9. As shown in FIG. 9, various weight assignment schemes may be used to use anchor information as guide information. FIG. 10 illustrates a scheme of emphasizing anchor information through operation 1040 of assigning a weight and operation 1060 of performing weighted fusion. Since anchor information corresponding to a geometric criterion for image restoration is emphasized in the above scheme, the scheme may be more effective in combining image information corresponding to each other through a pooling operation (for example, max pooling or average pooling) in comparison to a scheme of extracting a global feature from a local feature. Referring to FIG. 10, an image restoration apparatus may assign different weights to local feature maps 1031 to 1034. The image restoration apparatus may fuse the local feature maps 1031 to 1034 with each other while taking into consideration a weight set 1050 in operation 1060, and as a result, a global feature map 1070 may be generated. For example, the image restoration apparatus may assign weights $W_{101}$ to $W_{104}$ to the local feature maps 1031 to 1034 through Softmax and may sum the local feature maps 1031 to 1034 based on the weights $W_{101}$ to $W_{104}$, to generate the global feature map 1070.

For example, it may be assumed that the local feature map 1031 is extracted from an anchor image and the local feature maps 1032 to 1034 are extracted from the other individual images. In this example, the image restoration apparatus may set the weight $W_{101}$ of the local feature map 1031 to be higher than the weights $W_{102}$ to $W_{104}$ of the local feature maps 1032 to 1034. Accordingly, anchor information may be emphasized through feature information of the local feature map 1031. In another example, the image restoration apparatus may determine a similarity between the local feature map 1031 and each of the local feature maps 1032 to 1034, and may assign a relatively high weight to a feature map similar to the local feature map 1031 as well as the local feature map 1031. In this example, when a similarity between the local feature map 1032 and the local feature map 1031 is high, and a similarity between each of the local feature maps 1033 and 1034 and the local feature map 1031 is low, the image restoration apparatus may set the weights $W_{101}$ and $W_{102}$ of the local feature maps 1031 and 1032 to be higher than the weights $W_{103}$ and $W_{104}$ of the local feature maps 1033 and 1034. Thus, the anchor information may be strengthened through feature information of the local feature maps 1031 and 1032.

Figure 11:
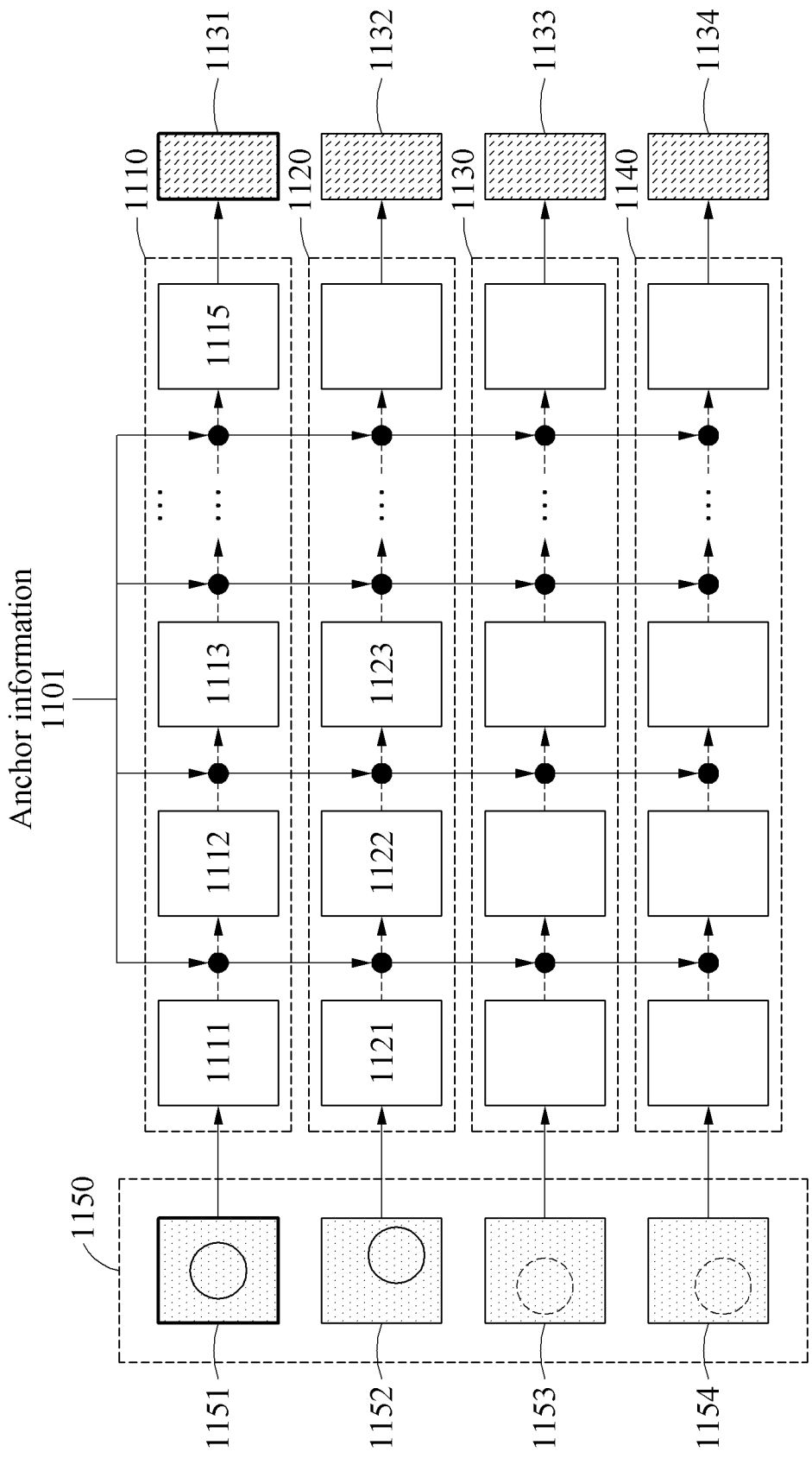
FIG. 11 illustrates an example of an operation of using anchor information in a process of extracting local features.

FIG. 11 illustrates an example of an operation of using anchor information in a process of extracting local features.

Referring to FIG. 11, an image restoration apparatus may extract local feature maps 1131 to 1134 from individual images 1151 to 1154 of a burst image set 1150 through operations 1110 to 1140 of extracting local features. The image restoration apparatus may emphasize anchor information in the process of extracting the local feature maps 1131 to 1134. For example, the image restoration apparatus may select the individual image 1151 as an anchor image and may generate anchor information 1101 based on the individual image 1151. The anchor information 1101 may include image information and/or feature information of the individual image 1151.

A feature extraction network (for example, a local feature extractor) may include a plurality of layers. The plurality of layers may be classified into layer groups, each including a portion of the layers. For example, each layer group may include a convolution layer and/or a pooling layer. The image restoration apparatus may extract local features while using the anchor information for each of a plurality of layer groups of the feature extraction network. The image restoration apparatus may extract local features through each layer group, and may fuse the anchor information 1101 with the extracted local features. The image restoration apparatus may iteratively perform the above process on all the layer groups, to generate the local feature maps 1131 to 1134.

For example, the image restoration apparatus may extract a primary local feature from the individual image 1151 through operation 1111 of extracting features using a first layer group, and may transform the primary local feature by fusing the anchor information 1101 with the primary local feature. The image restoration apparatus may extract a secondary local feature from the transformed primary local feature through operation 1112 of extracting features using a second layer group, and may transform the secondary local feature by fusing the anchor information 1101 with the secondary local feature. Also, the image restoration apparatus may extract a tertiary local feature from the transformed secondary local feature through operation 1113 of extracting features using a third layer group, and may transform the tertiary local feature by fusing the anchor information 1101 with the tertiary local feature. When operation 1115 of extracting features using a last layer group is completed, the local feature map 1131 may be generated as a result of operation 1115. Operations 1120 to 1140 associated with the other individual images 1152 to 1154 may also correspond to operation 1110 for the individual image 1151, and as a result, the local feature maps 1132 to 1034 may be generated.

In this example, the image restoration apparatus may fuse the same anchor information 1101 with an output of each layer group, or may fuse the anchor information 1101 specialized for each layer group. Fusion through common anchor information 1101 is described below. The common anchor information 1101 may be image information and/or feature information of an anchor image. To obtain the feature information, an operation of extracting features from the anchor image may be preemptively performed. For example, the above preemptive operation may be performed using a feature extraction network (for example, the feature extraction network 511 of FIG. 5, or the local feature extractor 611 of FIG. 6) used for operations 1110 to 1140, or using a separate feature extraction network. When common image information and/or common feature information are provided, the common image information and/or common feature information may be fused with an output, for example, a local feature, of each layer group according to operations 1110 to 1140.

Subsequently, fusion through specialized anchor information 1101 is described below. The specialized anchor information 1101 may be information processed to be suitable for each layer group, unlike the common anchor information 1101. The specialized anchor information 1101 may include stepwise local features of an anchor image extracted through each layer group. For example, when a first local feature to a third local feature of the anchor image are extracted through the first layer group to the third layer group, the first local feature to the third local feature may be used as anchor information 1101 specialized for the first layer group to the third layer group. Thus, the first local feature may be fused with each of the local features extracted through operations 1111 and 1121, the second local feature may be fused with each of the local features extracted through operations 1112 and 1122, and the third local feature may be fused with each of the local features extracted through operations 1113 and 1123.

Figure 12:
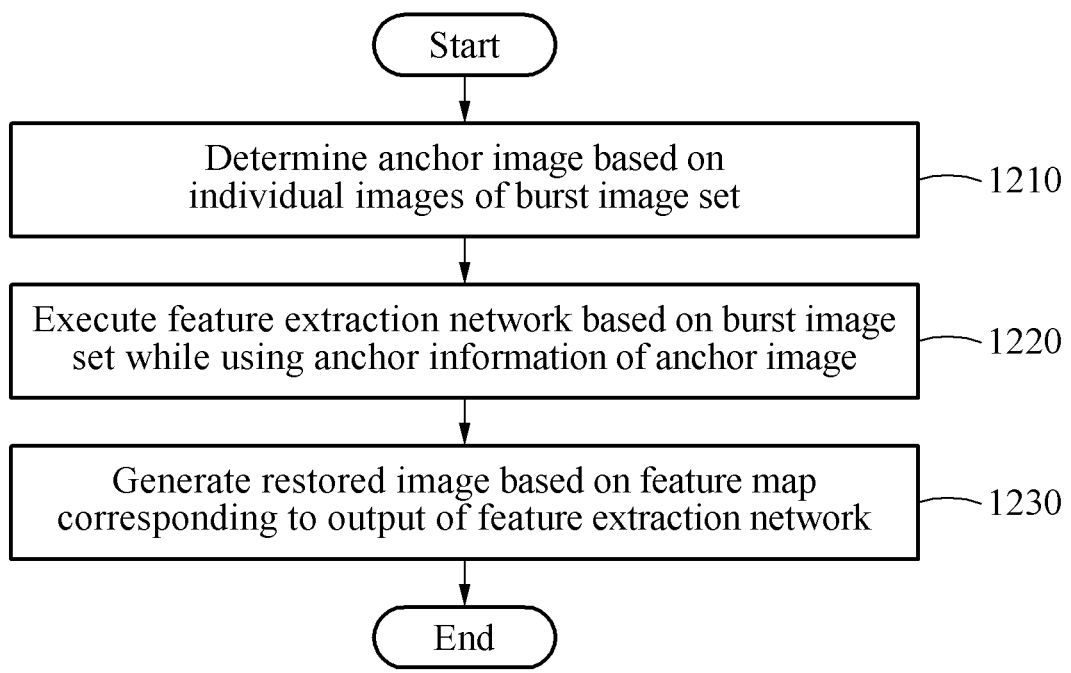
FIG. 12 illustrates an example of an image restoration method.

FIG. 12 illustrates an example of an image restoration method. Referring to FIG. 12, in operation 1210, an image restoration apparatus may determine an anchor image based on individual images of a burst image set. The image restoration apparatus may select an anchor image among the individual images based on the qualities of the individual images. Also, the image restoration apparatus may select an arbitrary image among the individual images as an anchor image.

In operation 1220, the image restoration apparatus may execute a feature extraction network based on the burst image set while using anchor information of the anchor image. The image restoration apparatus may extract a primary local feature from a first individual image among the individual images using a first layer group of the feature extraction network, may transform the primary local feature by fusing the anchor information with the primary local feature, and may extract a secondary local feature from the transformed primary local feature using a second layer group of the feature extraction network. Also, the image restoration apparatus may transform the secondary local feature by fusing the anchor information with the secondary local feature, may extract a tertiary local feature from the transformed secondary local feature using a third layer group of the feature extraction network, and may determine a global feature based on the tertiary local feature.

In an example, the image restoration apparatus may extract an anchor local feature from the anchor image, may extract a local feature from an image other than the anchor image among the individual images, and may extract a global feature from the anchor local feature and the local feature of the image while using the anchor local feature. In this example, the image restoration apparatus may extract the global feature from the anchor local feature and the local feature of the image by assigning a higher weight to the anchor local feature than the local feature of the image.

In another example, the image restoration apparatus may extract an anchor local feature from the anchor image, may extract a local feature from an image other than the anchor image among the individual images, may extract a global feature from the anchor local feature and the local feature of the image and may fuse the anchor local feature with the global feature. Also, the image restoration apparatus may generate input images of a neural network model by fusing anchor information with each of the individual images.

In operation 1230, the image restoration apparatus may generate a restored image based on a feature map corresponding to an output of the feature extraction network. The image restoration apparatus may execute an image restoration network based on the feature map. The description of FIGS. 1 to 11 may apply to the image restoration method.

Figure 13:
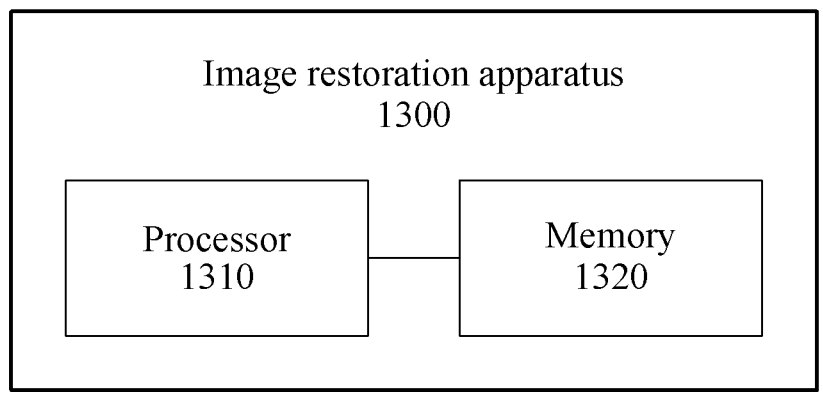
FIG. 13 illustrates an example of a configuration of an image restoration apparatus.

FIG. 13 illustrates an example of a configuration of an image restoration apparatus. Referring to FIG. 13, an image restoration apparatus 1300 may include a processor 1310, and a memory 1320. The memory 1320 may be connected to the processor 1310, and may store instructions executable by the processor 1310, data to be computed by the processor 1310, or data processed by the processor 1310. The memory 1320 may include, for example, a non-transitory computer-readable storage medium, for example, a high-speed random access memory (RAM) and/or a non-volatile computer-readable storage medium (for example, at least one disk storage device, a flash memory device, or other non-volatile solid state memory devices).

The processor 1310 may execute instructions to perform the operations described above with reference to FIGS. 1 to 12. For example, the processor 1310 may determine an anchor image based on individual images of a burst image set, execute a feature extraction network based on the burst image set while using anchor information of the anchor image, and generate a restored image based on a feature map corresponding to an output of the feature extraction network. In addition, the description of FIGS. 1 to 12 is also applicable to the image restoration apparatus 1300.

Figure 14:
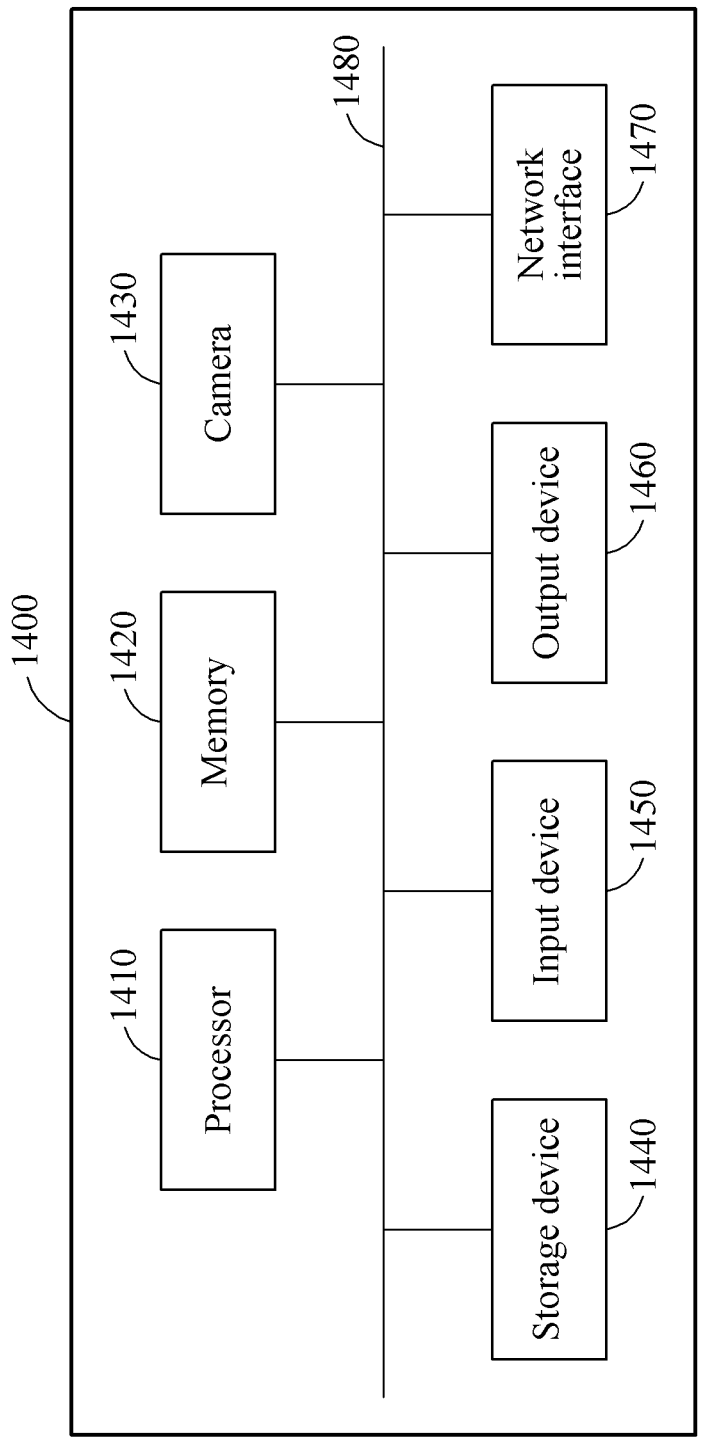
FIG. 14 illustrates an example of a configuration of an electronic apparatus.

FIG. 14 illustrates an example of a configuration of an electronic apparatus. Referring to FIG. 14, the electronic apparatus 1400 may include a processor 1410, a memory 1420, a camera/image sensor 1430, a storage device 1440, an input device 1450, an output device 1460, and a network interface 1470. The processor 1410, the memory 1420, the camera/image sensor 1430, the storage device 1440, the input device 1450, the output device 1460, and the network interface 1470 may communicate with each other via a communication bus 1480. For example, the electronic apparatus 1400 may be implemented as at least a portion of, for example, a mobile device such as a mobile phone, a smartphone, a personal digital assistant (PDA), a netbook, a tablet computer or a laptop computer, a wearable device such as a smartwatch, a smart band or smart glasses, a computing device such as a desktop or a server, home appliances such as a television (TV), a smart TV or a refrigerator, a security device such as a door lock, or a vehicle such as an autonomous vehicle or a smart vehicle. The electronic apparatus 1400 may structurally and/or functionally include the image restoration apparatus 100 of FIG. 1 and/or the image restoration apparatus 1300 of FIG. 13.

The processor 1410 may execute instructions and functions in the electronic apparatus 1400. For example, the processor 1410 may process instructions stored in the memory 1420 or the storage device 1440. The processor 1410 may perform at least one of the operations described above with reference to FIGS. 1 to 13. The memory 1420 may include a non-transitory computer-readable storage medium or a non-transitory computer-readable storage device. The memory 1420 may store instructions that are to be executed by the processor 1410, and may also store information associated with software and/or applications when the software and/or applications are being executed by the electronic apparatus 1400.

The camera/image sensor 1430 may capture a photo and/or a video. For example, the camera/image sensor 1430 may consecutively capture photos or film a video to generate a burst image set. When the burst image set includes successive photos, each individual image of the burst image set may correspond to each photo. When the burst image set is a video, each individual image of the burst image set may correspond to each frame of the video. The storage device 1440 may include a non-transitory computer-readable storage medium or a non-transitory computer-readable storage device. In an example, the storage device 1440 may store a greater amount of information than that of the memory 1420 for a relatively long period of time. For example, the storage device 1440 may include magnetic hard disks, optical disks, flash memories, floppy disks, or other forms of non-volatile memories known in the art.

The input device 1450 may receive an input from a user through a traditional input scheme using a keyboard and a mouse, and through a new input scheme such as a touch input, a voice input and an image input. The input device 1450 may include, for example, a keyboard, a mouse, a touch screen, a microphone, or other devices configured to detect an input from a user and transmit the detected input to the electronic apparatus 1400. The output device 1460 may provide a user with an output of the electronic apparatus 1400 through a visual channel, an auditory channel, or a tactile channel. The output device 1460 may include, for example, a display, a touchscreen, a speaker, a vibration generator, or any other device configured to provide a user with the output. The network interface 1470 may communicate with an external device via a wired or wireless network.

The image restoration apparatus 100, image restoration apparatus 1300, processor 1310, and memory 1320 in FIG. 1-13 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image restoration method comprising:
determining an anchor image based on individual images of a burst image set without aligning the individual images;
executing a feature extraction network based on the burst image set while using anchor information of the anchor image; and
generating a restored image based on a feature map corresponding to an output of the feature extraction network,
wherein the executing of the feature extraction network includes fusing the anchor information of the anchor image with features of the individual images,
wherein the executing of the feature extraction network comprises extracting a local feature while using the anchor information for each of a plurality of layer groups of the feature extraction network, and
wherein the executing of the local feature comprises:
extracting a primary local feature from a first individual image of the individual images using a first layer group of the plurality of layer groups;
transforming the primary local feature by fusing the anchor information with the primary local feature;
extracting a secondary local feature from the transformed primary local feature using a second layer group of the plurality of layer groups; and
determining a global feature based on the secondary local feature.

2. The method of claim 1, wherein the determining of the anchor image comprises selecting one individual image, as the anchor image, among the individual images based on any one or any combination of any two or more of an image-deterioration-based selection, a time interval-based selection, and a random selection, and wherein the image-deterioration-based selection is performed based on at least one quality feature of a minimum amount of noise/blur, a maximum signal-to-noise ratio (SNR), and a highest sharpness among the individual images.

3. The method of claim 1, wherein the determining of the anchor image comprises generating a new individual image, as the anchor image, by applying weights to the individual images.

4. The method of claim 1, wherein the anchor information comprises either one or both of image information of the anchor image and feature information of the anchor image.

5. The method of claim 1, further comprising:
generating input images for the feature extraction network by fusing the anchor information with each of the individual images.

6. The method of claim 1, wherein the executing of the feature extraction network comprises:
extracting an anchor local feature from the anchor image;
extracting a local feature from another image among the individual images;
extracting a global feature from the anchor local feature and the local feature; and
fusing the anchor local feature with the global feature.

7. The method of claim 1, wherein the executing of the feature extraction network comprises:
extracting an anchor local feature from the anchor image;
extracting a local feature from another image among the individual images; and
extracting a global feature from the anchor local feature and the local feature while using the anchor local feature.

8. The method of claim 7, wherein the executing of the global features comprises extracting the global feature from the anchor local feature and the local feature of the other image by assigning a higher weight to the anchor local feature than the local feature of the other image.

9. The method of claim 1, wherein the generating of the restored image comprises executing an image restoration network based on the feature map.

10. A non-transitory computer-readable storage medium storing instructions that, when executed by one or more processors, cause the one or more processors to perform the method of claim 1.

11. An image restoration method comprising:
determining an anchor image based on individual images of a burst image set;
executing a feature extraction network based on the burst image set while using anchor information of the anchor image; and
generating a restored image based on a feature map corresponding to an output of the feature extraction network,
wherein the executing of the feature extraction network comprises extracting a local feature while using the anchor information for each of a plurality of layer groups of the feature extraction network, and
wherein the executing of the local feature comprises:
extracting a primary local feature from a first individual image of the individual images using a first layer group of the plurality of layer groups;
transforming the primary local feature by fusing the anchor information with the primary local feature;
extracting a secondary local feature from the transformed primary local feature using a second layer group of the plurality of layer groups; and
determining a global feature based on the secondary local feature.

12. An image restoration apparatus comprising:
one or more processors; and
a memory comprising instructions executable by the one or more processors,
wherein in response to the instructions being executed by the one or more processors, the one or more processors are configured to:
determine an anchor image based on individual images of a burst image set without aligning the individual images;
execute a feature extraction network based on the burst image set while using anchor information of the anchor image; and
generate a restored image based on a feature map corresponding to an output of the feature extraction network,
wherein the executing of the feature extraction network includes fusing the anchor information of the anchor image with features of the individual images,
wherein the one or more processors are further configured to extract a local feature wile using the anchor information for each of a plurality of layer groups of the feature extraction network, and
wherein the one or more processors, in the executing of the local feature, are further configured to:
extract a primary local feature from a first individual image of the individual images using a first layer group of the plurality of layer groups;
transform the primary local feature by fusing the anchor information with the primary local feature;
extract a secondary local feature from the transformed primary local feature using a second layer group of the plurality of layer groups; and
determine a global feature based on the secondary local feature.

13. The apparatus of claim 12, wherein the one or more processors are further configured to:
select the anchor image among the individual images based on any one or any combination of any two or more of an image-deterioration-based selection, a time interval-based selection, and a random selection, or
generate the anchor image by applying weights to the individual images,
wherein the image-deterioration-based selection is performed based on at least one of a minimum amount of noise/blur, a maximum signal-to-noise ratio (SNR), and a highest sharpness among the individual images.

14. The apparatus of claim 12, wherein the one or more processors are further configured to:
extract an anchor local feature from the anchor image;
extract a local feature from another image among the individual images; and
extract a global feature from the anchor local feature and the local feature of the other image while using the anchor local feature.

15. The apparatus of claim 12, wherein the one or more processors are further configured to extract a local feature while using the anchor information for each of a plurality of layer groups of the feature extraction network.

16. An electronic apparatus comprising:
a camera configured to generate a burst image set; and
one or more processors configured to:
determine an anchor image based on individual images of the burst image set without aligning the individual images;

execute a feature extraction network based on the burst image set while using anchor information of the anchor image; and generate a restored image based on a feature map corresponding to an output of the feature extraction network, wherein the executing of the feature extraction network includes fusing the anchor information of the anchor image with features of the individual images, wherein the one or more processors are further configured to extract a local feature wile using the anchor information for each of a plurality of layer groups of the feature extraction network, and wherein the one or more processors, in the executing of the local feature, are further configured to:

extract a primary local feature from a first individual image of the individual images using a first layer group of the plurality of layer groups;

transform the primary local feature by fusing the anchor information with the primary local feature;

extract a secondary local feature from the transformed primary local feature using a second layer group of the plurality of layer groups; and determine a global feature based on the secondary local feature.

17. The electronic apparatus of claim 16, wherein the one or more processors are further configured to:

select the anchor image among the individual images based on any one or any combination of any two or more of an image-deterioration-based selection, a time interval-based selection, and a random selection, or generate the anchor image by applying weights to the individual images, wherein the image-deterioration-based selection is performed based on at least one of a minimum amount of noise/blur, a maximum signal-to-noise ratio (SNR), and a highest sharpness among the individual images.

18. The electronic apparatus of claim 16, wherein the one or more processors are further configured to:

extract an anchor local feature from the anchor image;

extract a local feature from another image among the individual images; and extract a global feature from the anchor local feature and the local feature of the other image while using the anchor local feature.

19. The electronic apparatus of claim 16, wherein the one or more processors are further configured to extract a local feature while using the anchor information for each of a plurality of layer groups of the feature extraction network.

* * * * *